(12) United States Patent
Konstad et al.

(10) Patent No.: US 6,504,719 B2
(45) Date of Patent: Jan. 7, 2003

(54) COMPUTER SYSTEM THAT CAN BE OPERATED WITHOUT A COOLING FAN

(75) Inventors: Rolf A. Konstad, Gold River, CA (US); Paul J. Gwin, Orangevale, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/823,594

(22) Filed: Mar. 30, 2001

(65) Prior Publication Data

US 2002/0149909 A1 Oct. 17, 2002

(51) Int. Cl.$^7$ ................................................. H05K 7/20
(52) U.S. Cl. ..................... 361/698; 361/687; 361/689; 361/694; 361/695; 361/699; 361/701; 361/702; 361/709; 361/711; 174/15.1; 174/16.3; 165/80.7; 165/104.32
(58) Field of Search ................................ 361/687, 689, 361/695, 697, 698–707; 174/15.1, 15.2, 16.1; 165/80.2, 80.3, 80.4, 104.33, 122; 257/715; 62/259.2

(56) References Cited

U.S. PATENT DOCUMENTS

| | | | | |
|---|---|---|---|---|
| 5,704,416 A | * | 1/1998 | Larson et al. | 165/104.33 |
| 5,731,954 A | * | 3/1998 | Cheon | 361/699 |
| 5,737,923 A | * | 4/1998 | Gilley et al. | 62/3.7 |
| 5,926,370 A | * | 7/1999 | Cromwell | 361/700 |
| 5,953,930 A | * | 9/1999 | Chu et al. | 62/259.2 |
| 6,029,742 A | * | 2/2000 | Burward-Hoy | 165/80.4 |
| 6,115,252 A | * | 9/2000 | Ohta et al. | 361/700 |
| 6,166,907 A | * | 12/2000 | Chien | 361/699 |
| 6,305,463 B1 | * | 10/2001 | Salmonson | 165/80.3 |

* cited by examiner

Primary Examiner—Boris Chervinsky
(74) Attorney, Agent, or Firm—Blakely, Sokoloff, Taylor & Zafman LLP

(57) ABSTRACT

A computer system is provided having a heat exchanger that is relatively large. Although the heat exchanger is large, it is still sufficiently light because of its plastic material. Because of the large size of the heat exchanger, a relatively large surface is provided by the cumulative outer surfaces of fins. The relatively large surface area results in a lower heat flux. The lower heat flux obviates the need for forced convection. There is thus no need to use fans when the computer system is at room temperature.

22 Claims, 6 Drawing Sheets

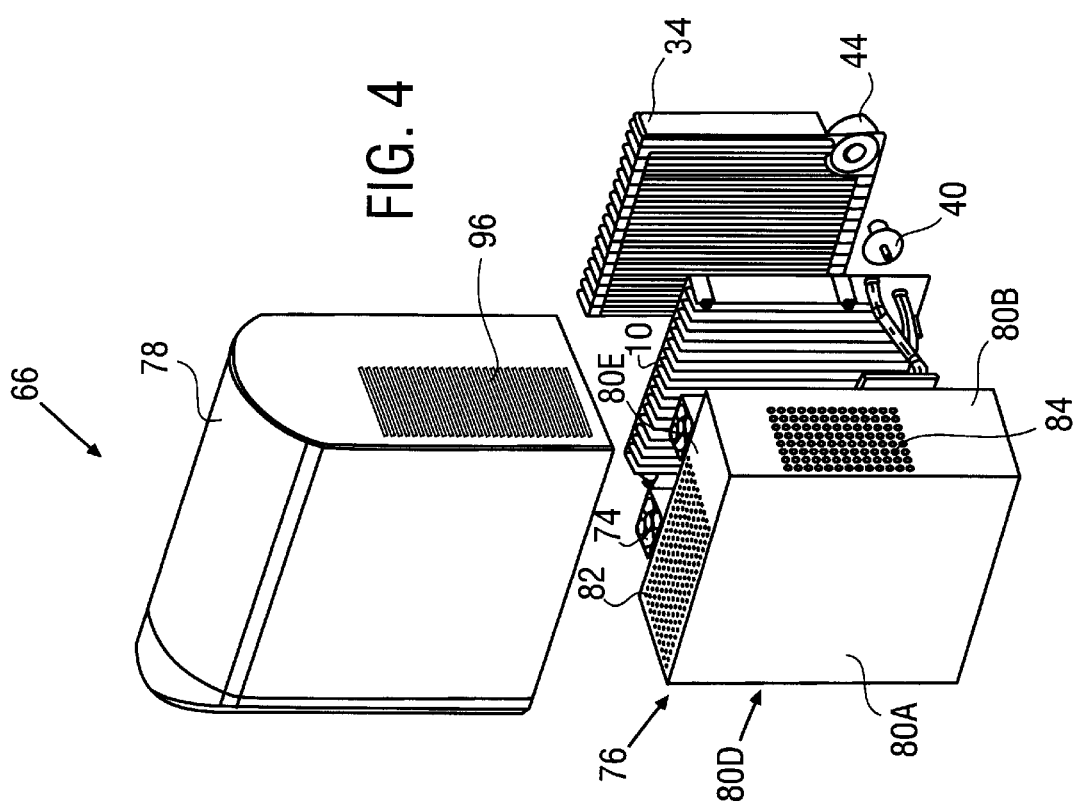
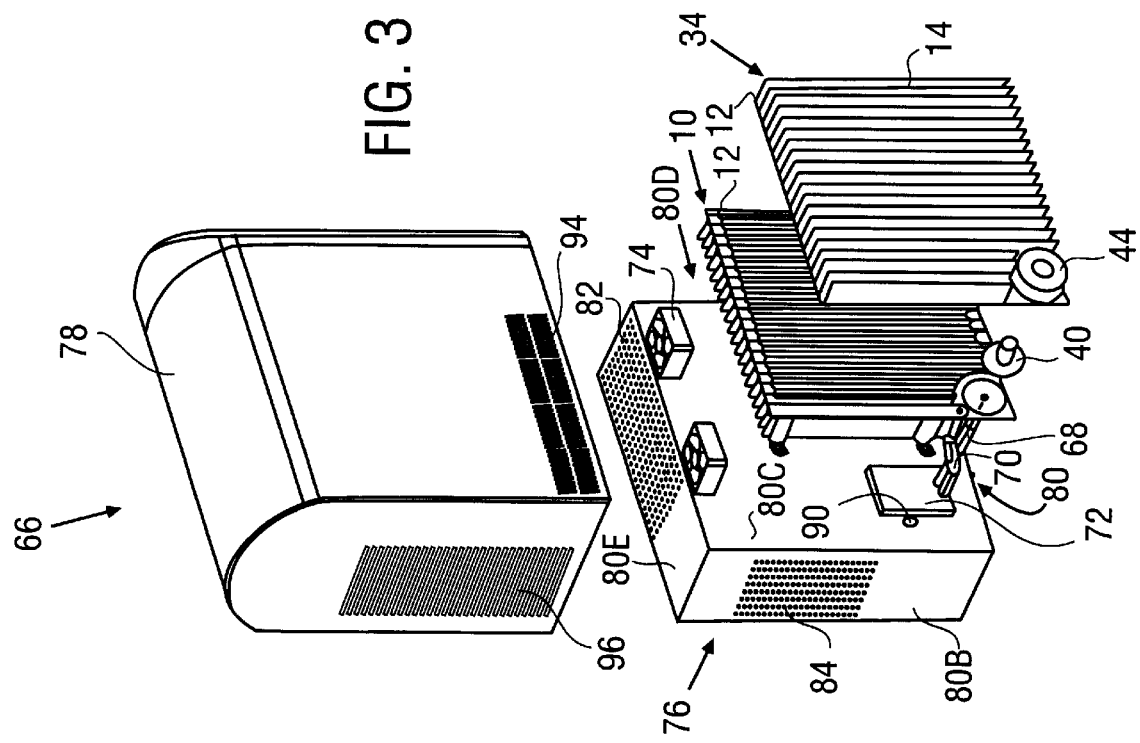

COMPUTER SYSTEM THAT CAN BE OPERATED WITHOUT A COOLING FAN

BACKGROUND OF THE INVENTION

1). Field of the Invention

This invention relates to a computer system and its cooling.

2). Discussion of Related Art

A computer system has a computer processor, mounted to a computer processor board, which generates heat when being operated. In early generation processors the amount of heat generated was sufficiently low so as to be efficiently convected to atmosphere without the need for additional equipment. As processors have become more complex and faster, more heat is being generated by these processors. A cooling apparatus is usually included to cool these processors. Such a cooling apparatus often includes a heat exchanger having fins to which the heat is conducted and from where the heat is convected to ambient. A fan is also usually provided which blows air over the fins of the heat exchanger.

A fan is usually quite noisy, even when located within an enclosure of such a computer system. Noise can be particularly bothersome in a quiet environment. Quiet environments are usually at lower temperatures because air conditioners are usually not used at lower temperatures. Air conditioners are usually used at higher temperatures and then generate a certain amount of white noise. White noise tends to hide noise from any computer fan. A computer fan operating in an environment at a higher temperature is thus not usually as bothersome.

BRIEF DESCRIPTION OF THE DRAWINGS

The invention is further described by way of examples with reference to the accompanying drawings wherein:

FIG. 3 is a perspective view of a computer system according to an embodiment of the invention, shown in exploded form;

FIG. 4 is a perspective view of the computer system from an opposing side;

DETAILED DESCRIPTION OF THE INVENTION

Figure 1:
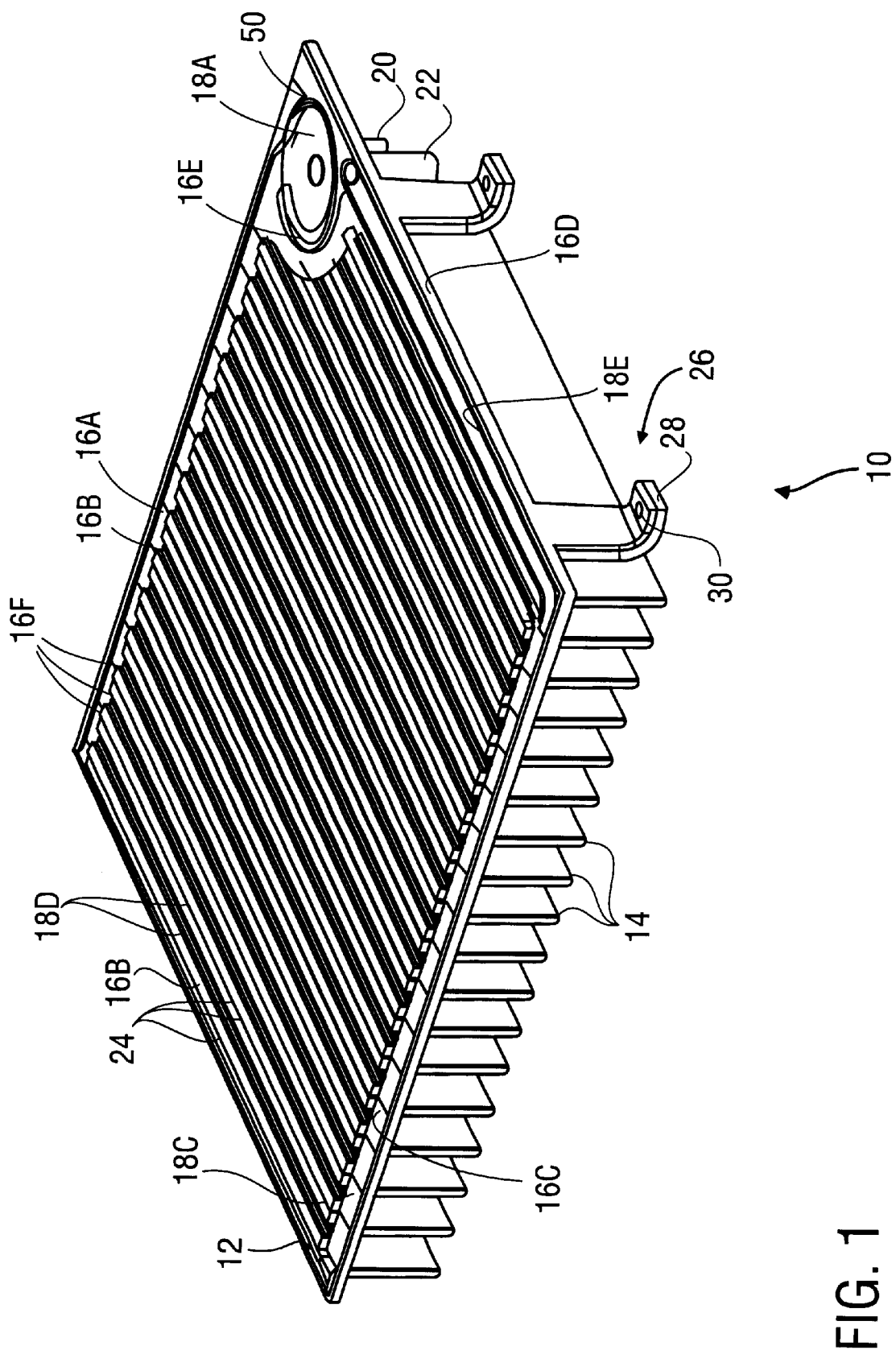
FIG. 1 is a perspective view of a first half of a heat exchanger used in a computer system according to an embodiment of the invention.

FIG. 1 of the accompanying drawings illustrates a first half 10 of a heat exchanger used in a computer system according to an embodiment of the invention. The first half 10 is injection molded entirely from a plastics material and includes a base 12 and fins 14 extending from the base 12.

Ridges 16A–F are formed on a surface of the base 12. Recesses 18A–E are formed between the ridges 16A–F.

The ridges 16A–D are peripheral ridges located at four edges of the base 12.

A ridge 16E is a pump housing ridge located near a corner of the base 12. The recess 18A is an impeller housing recess defined within the pump housing ridge 16E.

The ridges 16F are parallel divider ridges. The divider ridges 16F stop short of the peripheral ridge 16A. The recess 18B is a supply manifold recess defined between the peripheral ridge 16A and ends of the divider ridges 16F.

The divider ridges 16F also stop short of the peripheral ridge 16C. The recess 18C is a return manifold recess defined between the peripheral ridge 16C and ends of the divider ridges 16F.

The recesses 18D are fin supply recesses. Each fin supply recess 18D leads from the supply manifold recess 18B to the return manifold recess 18C.

The recess 18E is a fluid return recess that leads out of the return manifold recess 18C.

First half 10 is also formed with an inlet port 20 and an outlet port 22. Both the inlet port 20 and the outlet port 22 extend from the base 12 on a side thereof opposing the ridges 16 and recesses 18. The inlet port 20 has an opening formed into the impeller housing recess 18A. The outlet port 22 is located near the inlet port 20 and has an opening formed out of the fluid return recess 18E.

A respective fin 14 directly opposes a respective fin supply recesses 18D. Each one of the fins 14 has a respective fin fluid supply channel 24 formed therein. The fin fluid supply channel 24 extends out of a respective fin supply recess 18D into the respective fin 14. A wall thickness between the fin supply channel 24 and an outer surface of the fin 14 is about 2 mm and substantially uniform over the entire fin. Heat can be transferred from the fin fluid supply channel 24 through the wall of the fin 14 to an outer surface of the fin 14. The mode of heat transfer of the fin 14 thus differs from the mode of heat transfer of a traditional fin wherein heat is conducted from a base of the fin to a tip of the fin.

Attachment standoffs 26 extend from the base 12. Each attachment standoff 26 extends from the base 12 past the fins 14 and terminates in a respective shoulder 28. An opening 30 is formed in each shoulder 28 through which a fastener such as a bolt or a screw can be inserted.

Figure 2:
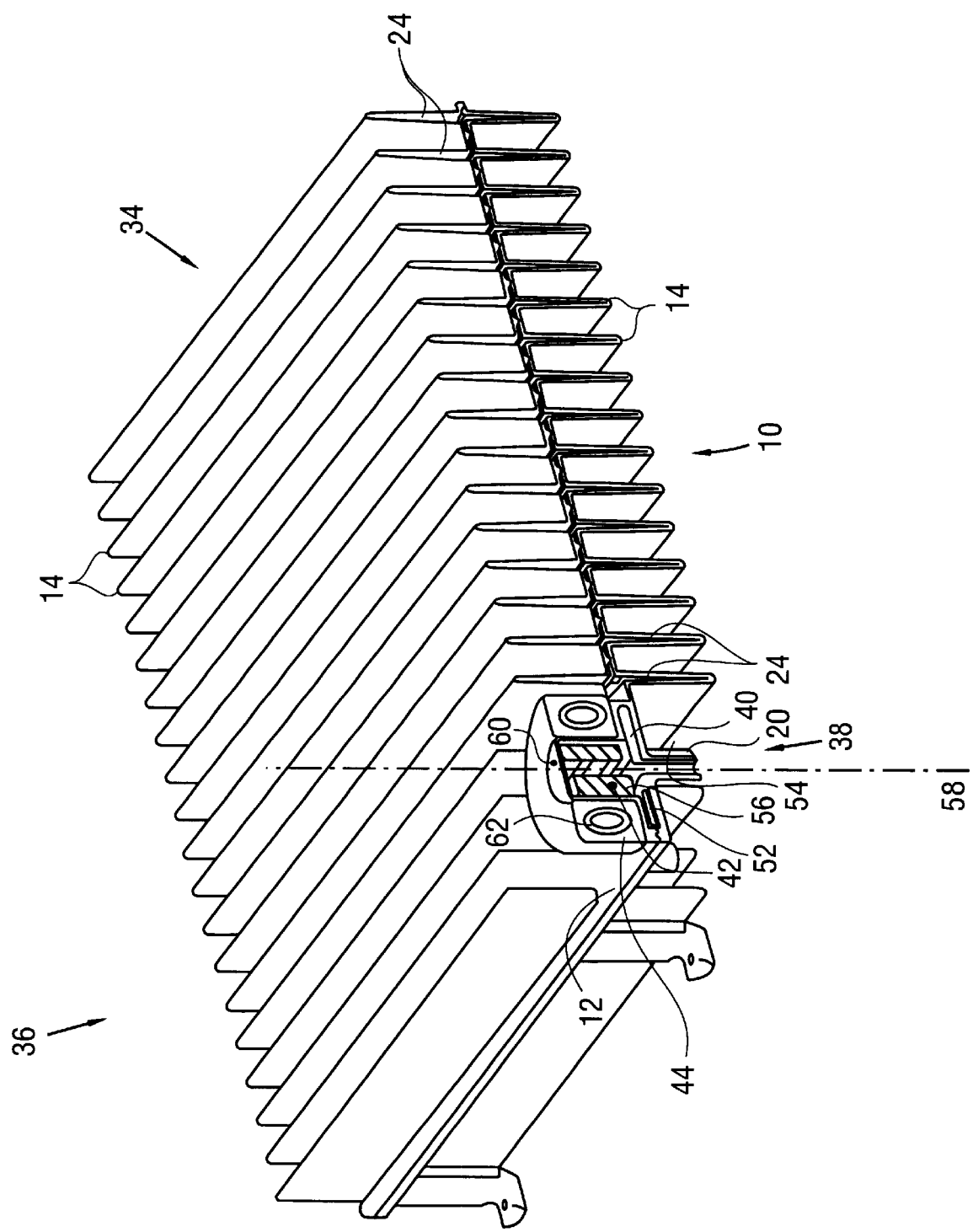
FIG. 2 is a perspective view of a heat exchanger including the first half and a second half, further showing a pump which is integrated with the heat exchanger.

FIG. 2 shows the first half 10 and a second half 34 of a heat exchanger 36. FIG. 2 also shows a pump 38 which includes an impeller 40, a rotor 42, and a stator 44.

A second half 34 is located against a first half 10. A face of the second half 34 is formed with ridges and recesses which are a mirror image of the ridges 16 and recesses in the first half shown in FIG. 1. All the ridges 16 shown in FIG. 1 have grooves 50 formed therein and all the ridges of the second half 34 have lips formed thereon, each lip fitting within a respective groove 50. The second half 34 also has a plurality of fins 14, each having a respective fin fluid channel 24 formed therein.

The recesses 18 and fin fluid channels within the first half 10 together with the recesses and fin fluid channels 24 in the second half 34 jointly form a heat exchanger volume that is enclosed within the heat exchanger 36. An impeller housing is formed by the recess 18A together with an opposing recess in the second half 34. A supply manifold is formed by the supply manifold recess 18B and an opposing supply manifold recess in the second half 34. The supply manifold leads out of the impeller housing. A return manifold is formed by the return manifold recess 18C together with a return manifold recess in the second half 34. A respective fin supply passage is formed by a respective fin supply recess 18D and an opposing fin supply recess in the second half 34. Each fin supply recess leads out of the supply manifold and into the return manifold. A fluid return passage is formed by the fluid return recess 18E and an opposing fluid return recess in the second half 34. The fluid return passage leads out of the return manifold. The opening in the inlet port 20 leads into the impeller housing and the opening in the outlet port 22 leads out of the fluid return passage.

The impeller 40 includes radial vanes 52, and a spigot 54. The spigot 54 has an opening formed therein and is located within the opening in the inlet port 20. The vanes 52 are located within the impeller housing which is partially formed by the impeller housing recess 18A and partially by an opposing recess in the second half 34. The rotor 42 includes a plurality of salient magnets 56 and is mounted to the vanes 52 on a side thereof opposing the spigot 54. The rotor 42 is rotatable together with the vanes 52 and about an axis 58.

The second half 34 is formed with a plastic cap-shaped cover 60. A mouth of the cover 60 seals circumferentially with a base 12 of the second half 34 and is located over the rotor 42. The cap 60 seals the rotor 42, vanes 52, and spigot 54 within the heat exchanger volume defined within the heat exchanger 36. The rotor 42, vanes 52, and spigot 54 are thus entirely located within the heat exchanger volume.

The stator 44 includes electromagnets 62 which are located around the cover 60 externally of the heat exchanger volume. The electromagnets 62 are thus not exposed to a fluid located within the heat exchanger volume. The electromagnets 62 are located at selected angular positions about the axis 58.

FIGS. 3 and 4 illustrate components of a computer system 66 which, in addition to the components described with reference to FIGS. 1 and 2, further includes a supply line hose 68, a return line hose 70, a cold plate 72, heat exchanger fans 74, a Faraday cage 76, and a shell 78.

The Faraday cage 76 includes four side panels 80A–D, a top panel 80E, and a lower panel 80F. Air inlet openings 82 are formed in the top panel 80E and air outlet openings 84 are formed in the side panel 80B. The openings 82 and 84 are sufficiently small so as to still attenuate electromagnetic induction (EMI) radiation.

The bases 12 of the first and second halves 10 and 34 are located substantially vertically. The first and second halves 10 and 34 are orientated so that the fins 14 extend vertically upwardly along a respective base 12.

The shoulders 28 are located against the side panel 80C. Fasteners such as bolts or screws are inserted through the openings 30 and into the side panel 80C, thereby securing the heat exchanger 86 to the Faraday cage 76 externally of the Faraday cage 76.

The cold plate 72 is located inside the Faraday cage 76. Openings 90 are formed in the side panel 80C. The supply line hose 68 is inserted through one of the openings 90 and the return line hose 70 is inserted through another one of the openings 90. A first end of the supply line hose 68 is connected to the cold plate 72 and a second end of the supply line hose 68 is connected to the inlet port (20 in FIG. 1). A first end of the return line hose 70 is connected to the outlet port (22 in FIG. 1) and a second end of the return line hose 70 is connected to the cold plate 72. The hoses 68 and 70 are flexible to allow for latitude in design in positioning of the cold plate 72 on a processor in the Faraday cage 76 (as opposed to for example heat pipes that are rigid).

The heat exchanger fans 74 are mounted to the side panel 80C above the heat exchanger 36. Rotation of the respective fans 74 draws air in from the bottom and expels air out of the top of the fan.

Figure 5:
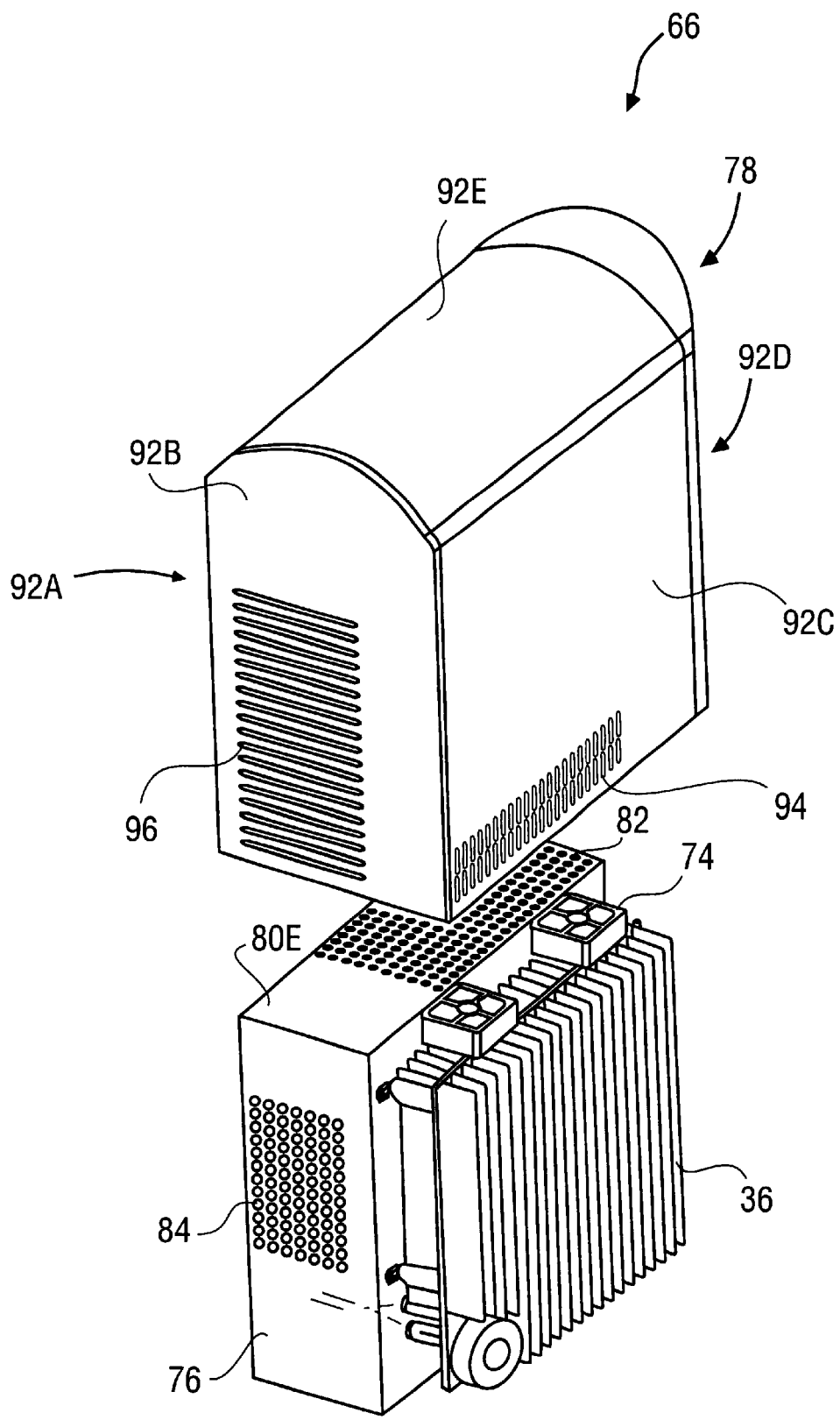
FIG. 5 is a perspective view of the computer system which is partially assembled.

FIG. 5 illustrates the computer system 66 assembled as hereinbefore described. The shell 78 includes side panels 92A–D and a top panel 92E. An inlet vent 94 is formed in the side panel 92C near a lower periphery thereof. An outlet vent 96 is formed in the side panel 92B. The shell 78 is located over the Faraday cage 76 and the heat exchanger 36. The inlet vent 94 is located next to a lower region of the heat exchanger 36. The outlet vent 96 is located over the outlet openings 84. A volume is defined between the upper panel 92E and the upper panel 80E. Air can flow from the heat exchanger 36 into the volume defined between the upper panel 92E and the upper panel 80E and from the volume through the inlet openings 82 into the Faraday cage 76.

Figure 6:
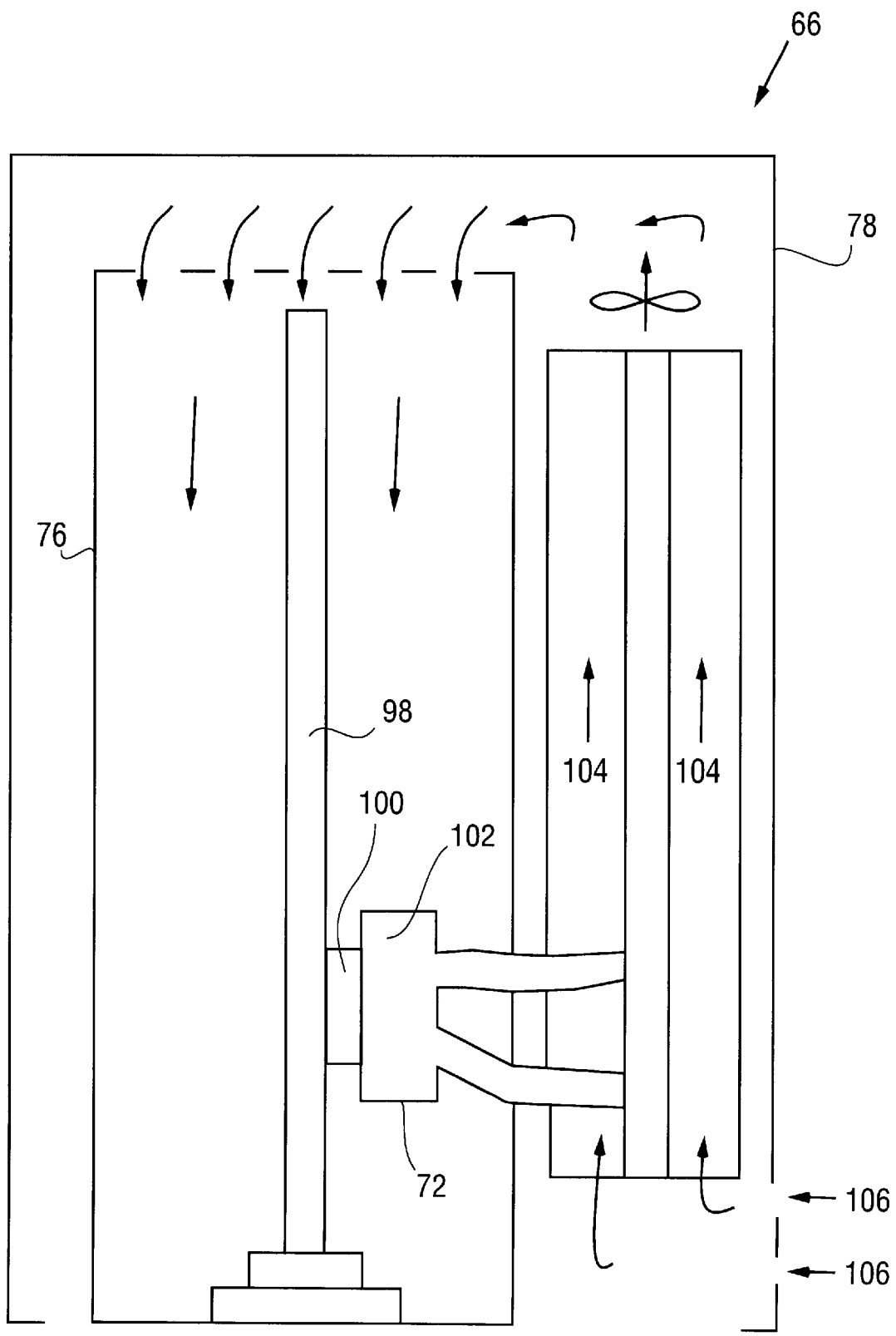
FIG. 6 is a cross-sectional side view of the computer system when finally assembled.

FIG. 6 is a cross-sectional side view of the computer system 66 after the shell 78 is installed. The computer system includes a computer processor board 98 located within the Faraday cage 76 and a computer processor 100 mounted to the computer processor board 98. The cold plate 72 is located against a package including the computer processor 100. The cold plate 72 is thereby thermally coupled to the computer processor 100. Heat can be transferred from the computer processor 100 to the cold plate 72 by way of conduction. Another embodiment may utilize another mode of thermally coupling a computer processor to a cold plate which may also utilize conduction but in addition or alternatively may utilize convection or flow of fluids. It is also possible for a cold plate to be located externally of a Faraday cage.

The cold plate 72 defines a cold plate volume 102 therein. The cold plate volume 102 and the heat exchanger volume within the heat exchanger 36 are filled with water or another cooling liquid.

In use, electric signals are transmitted to and from the computer output processor 100. Operation of the computer processor 100 causes heat to be generated by the computer processor 100. The heat is conducted from the computer processor 100 to the cold plate 72 and from the cold plate 72 to the liquid within the cold plate volume 102.

Referring to FIG. 2, current is supplied to the electromagnets 62. The electromagnets create magnetic fields. The magnetic fields pass through the plastic cover 60 into the salient magnets 56. The currents are alternated in a selective manner which causes changes in the magnetic fields. Changes in the magnetic fields create forces on the salient magnets 56 which rotate the rotor 42 about the axis 58. The impeller 40 is rotated together with the rotor 42 about the axis 58. Referring to FIG. 1 and FIG. 3, rotation of the vanes 52 of the impeller 40 about the axis 58 causes a liquid to be drawn into the inlet port 20 from the supply line hose 68, pass over the vanes 52, and be expelled form the vanes 52 into the supply manifold (see reference numerals 20 and 18B). The liquid flows from the supply manifold into the fin supply passages (see reference numeral 18D). The liquid flows from the fin supply passages into the fluid supply channels 24 within the fins 14. Heat is conducted from the fluid located within the fin fluid supply channels 24 through the walls of the fins to external surfaces of the fins 14. The liquid flows from the fin fluid supply channels 24 into the return manifold (see reference numeral 16C) and from the return manifold into the fluid return path (see reference numeral 18E), from where the liquid flows through the outlet port 22 the liquid flows from the outlet port into the return line hose.

Referring again to FIG. 6, outer surfaces of the fins that are heated causes heating of air around the fins 14 by way of convection. The air rises in a direction 104 when being heated. A natural convection path is created wherein air is drawn into openings of the inlet vent 94 in a direction 106 and then flows vertically upwardly over the fins 14 in the direction 104 into a volume 108 between the upper panel 80E and the upper panel 92E.

A computer fan (not shown) is typically included in a power supply of the computer system 66 and draws air through the air inlet openings 82 into the Faraday cage 76. The air then passes through the Faraday cage 76. Referring to FIG. 5, the air is then expelled by the fan through the air outlet openings 84 and the air outlet vent 96 to atmosphere.

The heat exchanger 36 is relatively large. Although the heat exchanger 36 is large, it is still sufficiently light because of its plastic material. Because of the large size of the heat exchanger 36, a relatively large surface is provided by the cumulative outer surfaces of the fins 14. The relatively large surface area results in a lower heat flux (amount of heat transferred per unit of area). The lower heat flux obviates the need for forced convection. There is thus no need to use the fans 74 when the computer system 66 is at room temperature. The fans 76 can still be operated at higher temperatures to provide additional airflow and cooling capability. The computer processor 100 may for example generate about 100 W of heat. The heat exchanger 36 may be designed from materials and have a surface area which is sufficiently large to dissipate 100 W of heat at 25° C., by only using natural convection and the fan located within the Faraday cage 76. Under such conditions the fans 74 would not be operated and would thus not contribute any noise. Should the temperature rise above 25° C., the fans 74 would automatically begin to turn. A building at temperatures above 25° C. would usually have air conditioning or fans that circulate air for comfort that create white noise which will tend to hide any noise from the fans 74.

A smaller Faraday cage 76 is provided because the heat exchanger 36 is located externally thereof. The smaller Faraday cage 76 allows for tighter control of EMI radiation. By locating the heat exchanger 36 externally of the Faraday cage 76, a risk that the heat exchanger 36 may catch fire is also reduced. Any risk that electric components in the Faraday cage 76 may be exposed to leaks from the heat exchanger 36 is also reduced by locating the heat exchanger 36 externally of the Faraday cage 76. Any possibility that a leak may occur is further reduced by integrating the pump 38 into the heat exchanger 36 as described.

Figure 7:
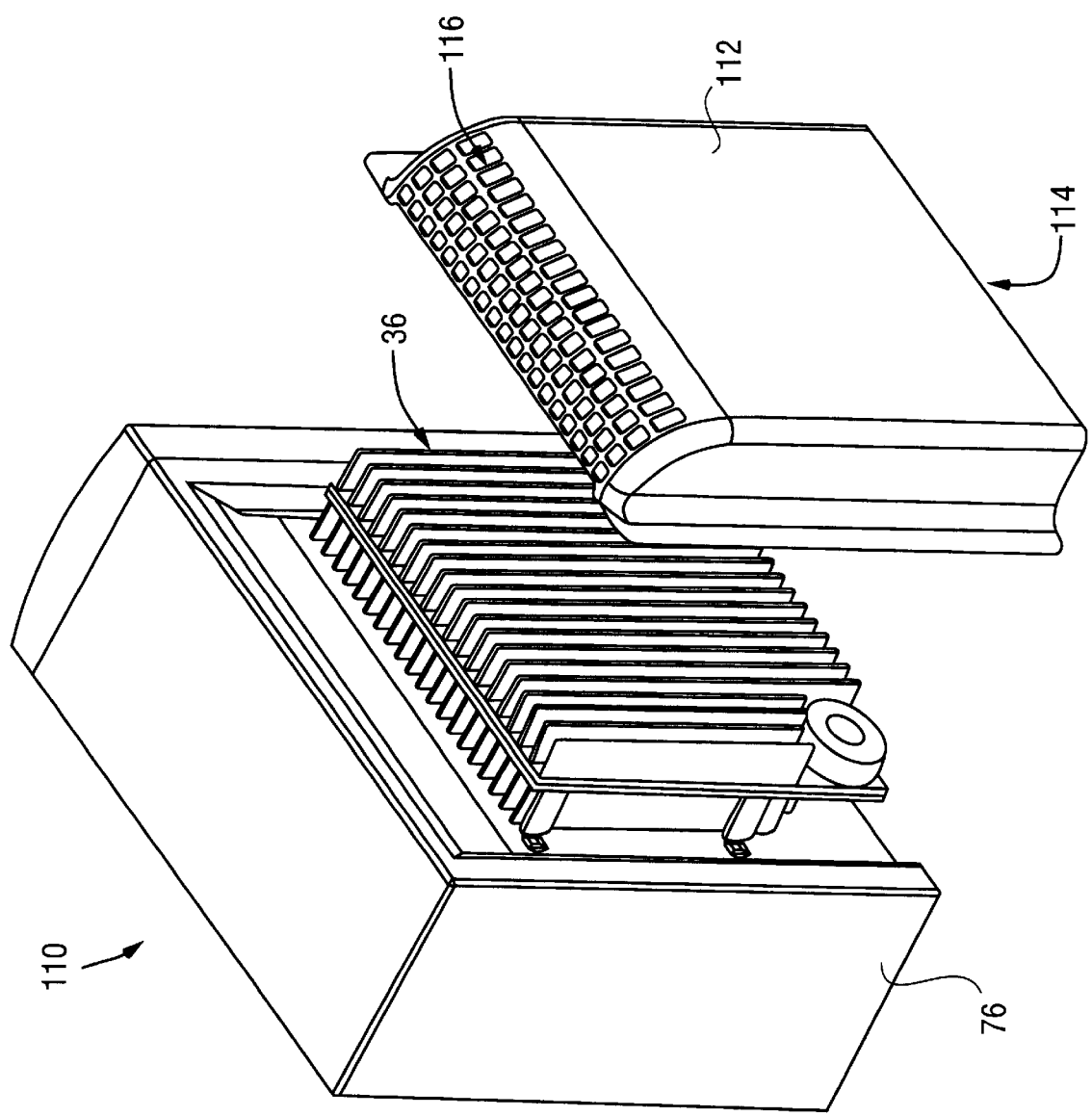
FIG. 7 is a perspective view of a computer system according to another embodiment of the invention.

FIG. 7 illustrates a computer system 110 according to another embodiment of the invention. A heat exchanger 36 is mounted to a Faraday cage 76 as hereinbefore described. The computer system 110 includes a shell 112 which is mounted to a panel of the Faraday cage 76 to which the heat exchanger 36 is mounted. A shell 112 has an air inlet vent 114 at a lower location and openings forming an air outlet vent 116 at a higher location. A natural convection path is created with air flowing from the air inlet vent 114 and then over fins of the heat exchanger 36, whereafter the air exits the shell 112 and the computer system 110 through the air outlet vent 116. Other aspects of the computer system 110 are the same as the computer system 66 hereinbefore described.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer system, comprising:
    a computer processor board;
    a computer processor mounted to the computer processor board;
    a cold plate thermally coupled to the computer processor, a cold plate volume to hold a cooling fluid being defined in the cold plate;
    a heat exchanger base, a heat exchanger volume being defined in the heat exchanger base;
    a plurality of ridges separating the heat exchanger volume into a plurality of fin supply passages; and
    fins extending from the heat exchanger base, a respective fluid supply channel extending from a respective fin supply passage into each fin, a supply path being formed so that the fluid can flow from the cold plate volume into fin supply passages and fluid supply channels, and a return path being formed so that the fluid can flow from the fluid supply channels into the cold plate volume.

2. The computer system of claim 1, further comprising:
    a Faraday cage, the computer processor board and the processor being located inside the Faraday cage and the heat exchanger base and fins located externally of the Faraday cage.

3. The computer system of claim 2, further comprising:
    a shell over the heat exchanger, the shell having a lower air vent to allow air into the shell at a lower elevation, and a higher air vent to allow the air out of the shell at a higher elevation, the air passing over the fins while the air is in the shell.

4. The computer system of claim 3, wherein the fins are oriented so that the air flows from a lower elevation to a higher elevation along a selected one of the fins while flowing from the lower air vent to the higher air vent.

5. The computer system of claim 4, wherein the selected fin extends from the heat exchanger base in a direction transverse to a direction of flow of the air over the fin.

6. The computer system of claim 2, wherein the heat exchanger base is mounted to the Faraday cage.

7. The computer system of claim 2, wherein the Faraday case has at least a first opening, further comprising a supply line that extends through the opening, the supply line having one end connected to the cold plate and an opposing end connected to the heat exchanger, the supply line defining the supply path.

8. The computer system of claim 1, wherein the fins are made of a plastics material.

9. The computer system of claim 8, wherein the heat exchanger base is made of the same material as the fins.

10. The computer system of claim 1, further comprising:
    a pump impeller, the heat exchanger base forming a pump housing around the pump impeller, the pump having an inlet port into the pump housing and an outlet port out of the pump housing, rotation of the impeller causing movement of the fluid through the inlet port and out of the outlet port.

11. The computer system of claim 10, further comprising:
    a plurality of rotor magnets mounted to the impeller, the pump housing forming a cover over the rotor magnets; and
    a plurality of electromagnets located externally of the pump housing, the electromagnets creating a magnetic field through the cover so that the rotor magnets are rotatable by varying current in the electromagnets.

12. The computer system of claim 11, wherein the cover is made of a plastics material.

13. The computer system of claim 12, wherein the heat exchanger base is made of the same material as the cover.

14. A computer system, comprising:

a Faraday cage;

a computer processor board located in the Faraday cage;

a cold plate thermally coupled to the computer processor, a cold plate volume to hold a cooling fluid being defined in the cold plate;

a heat exchanger base, a heat exchanger volume being defined in the heat exchanger base;

fins extending from the heat exchanger base and being located externally of the Faraday cage;

a supply line having a first end coupled to the cold plate so that the fluid can flow from the cold plate volume into the supply line, and a second end coupled to the heat exchanger base so that the fluid can flow from the supply line into the heat exchanger base;

a return line having a first end coupled to the heat exchanger base so that the fluid can flow from the heat exchanger volume into the return line and, a second end coupled to the cold plate so that the fluid can flow from the return line into the cold plate volume; and a shell over the heat exchanger, the combination of the Faraday cage and the shell having a lower air vent to allow air into the shell at a lower elevation, and a higher air vent to allow the air out of the shell at a higher elevation, the air passing over the fins while the air is in the shell.

15. The computer system of claim 14, wherein the fins are oriented so that the air flows from a lower elevation to a higher elevation along a selected one of the fins while flowing from the lower air vent to the higher air vent.

16. The computer system of claim 15, wherein the selected fin extends from the heat exchanger base in a direction transverse to a direction of flow of the air over the fin.

17. The computer system of claim 14, wherein the heat exchanger base is mounted to the Faraday cage.

18. The computer system of claim 14, wherein the Faraday case has at least a first opening and the supply line extends through the opening.

19. A computer system, comprising:

a computer processor board;

a computer processor mounted to the computer processor board;

a cold plate thermally coupled to the computer processor, a cold plate volume to hold a cooling fluid being defined in the cold plate;

a first heat exchanger base;

a second heat exchanger base, a heat exchanger volume being defined between the first and second heat exchanger bases;

a pump impeller, the heat exchanger bases forming a housing around the pump impeller;

fins extending from the first heat exchanger base;

fins extending from the second heat exchanger base;

a supply line having a first end coupled to the cold plate so that the fluid can flow from the cold plate volume into the supply line, and a second end coupled to at least one of the heat exchanger bases so that the fluid can flow from the supply line into the heat exchanger volume; and a return line having a first end coupled to at least one of the heat exchanger bases so that the fluid can flow from the heat exchanger volume into the return line, and a second end coupled to the cold plate so that the fluid can flow from the return line into the cold plate volume.

20. The computer system of claim 19, further comprising:

a plurality of rotor magnets mounted to the impeller, the pump housing forming a cover over the rotor magnets; and a plurality of electromagnets located externally of the pump housing, the electromagnets creating a magnetic field through the cover so that the rotor magnets are rotatable by varying current in the electromagnets.

21. The computer system of claim 20, wherein the cover is made of a plastics material.

22. The computer system of claim 21, wherein the heat exchanger base is made of the same material as the cover.

* * * * *